May 7, 1963 R. A. ROBERT ETAL 3,088,373
APPARATUS FOR STORING AND FIRING ROCKET BOMBS FROM AIRCRAFT
Filed Dec. 23, 1959 5 Sheets-Sheet 1

INVENTORS
ROGER AIME ROBERT
PIERRE PAUL MATGE

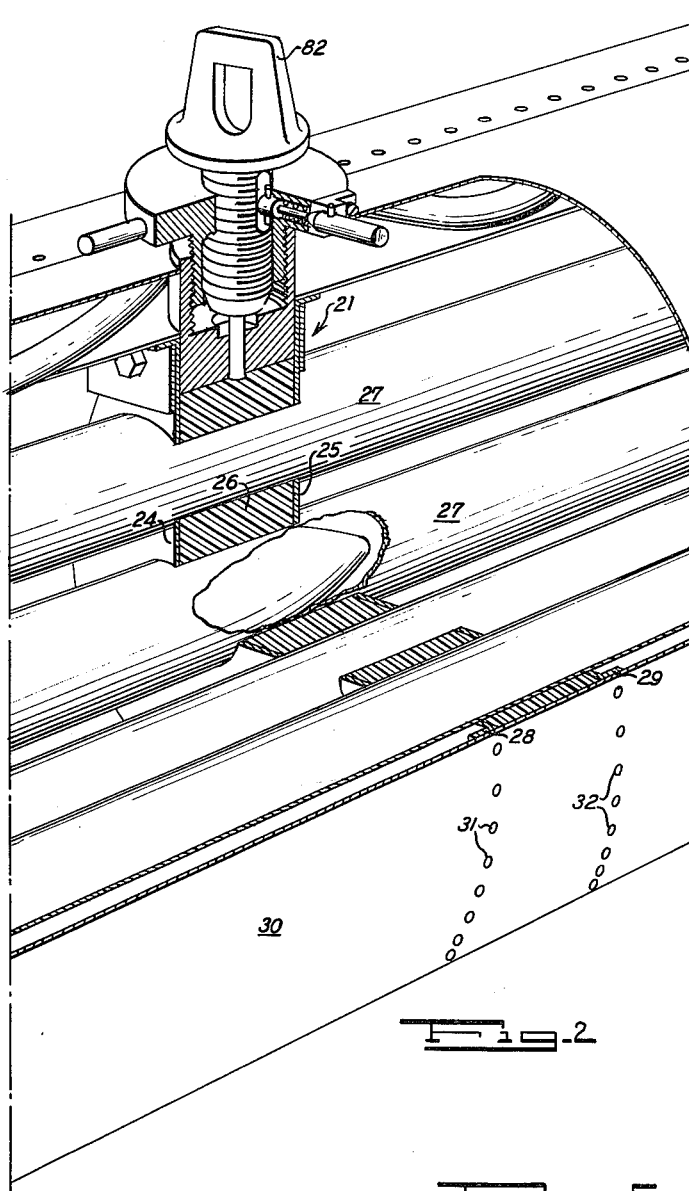
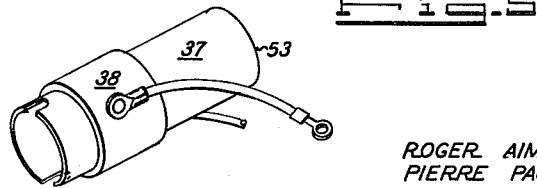

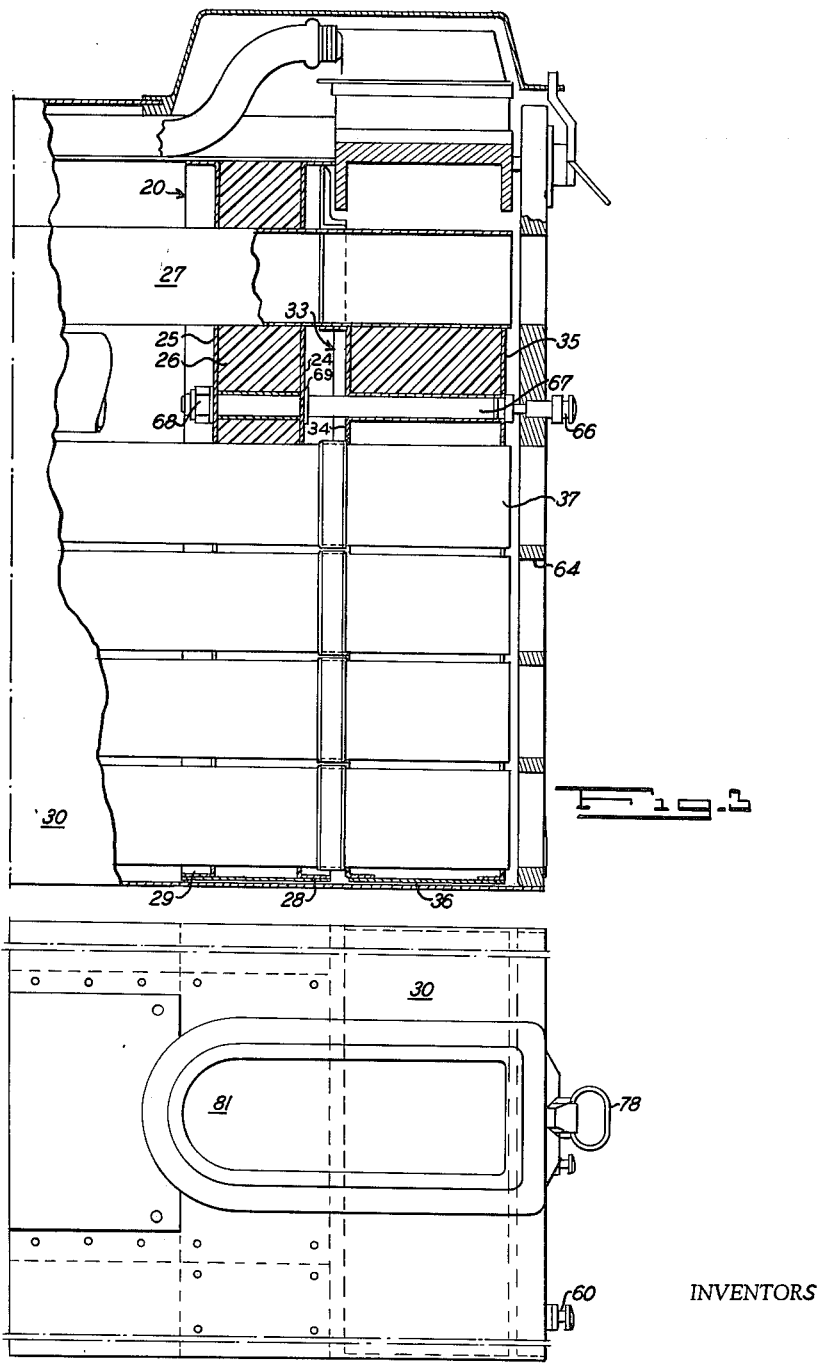

INVENTOR
ROGER AIME ROBERT
PIERRE PAUL MATGE

May 7, 1963  R. A. ROBERT ETAL  3,088,373
APPARATUS FOR STORING AND FIRING ROCKET BOMBS FROM AIRCRAFT
Filed Dec. 23, 1959  5 Sheets-Sheet 5

INVENTORS
ROGER AIME ROBERT
PIERRE PAUL MATGE

United States Patent Office 3,088,373
Patented May 7, 1963

3,088,373
APPARATUS FOR STORING AND FIRING ROCKET BOMBS FROM AIRCRAFT
Roger A. Robert, 33 Blvd. d'Angleterre, Le Vesinet, Seine-et-Oise, France, and Pierre P. Matge, 32 Rue de la Somme, Cachan, Seine, France
Filed Dec. 23, 1959, Ser. No. 861,570
Claims priority, application France Dec. 31, 1958
4 Claims. (Cl. 89—1.7)

Our invention relates to apparatus for storing and firing rocket bombs from aircraft, and to a method of producing such apparatus.

A known type of apparatus for storing and firing a plurality of rockets comprises a plurality of tubes extending in a parallel, generally annular, nest, each containing a rocket and serving to guide it over an initial part of its trajectory, and means for releasing the rockets from the tubes in a predetermined sequence.

It is an object of this invention to provide apparatus of that type which will be of simplified construction, and consequently less expensive, more lightweight and hence better suited for aviation purposes, and which will have a greater rocket holding capacity for a given set of dimensions, and one that will be safe and reliable in operation especially as regards the firing of the rockets.

The invention is characterized by the use as a connecting means between the retainer and guide-tubes, or portions thereof, on the one hand, with the supporting structure or flanges thereof on the other hand, of a settable plastic foam composition adapted to be poured in fluid or semi-fluid state and thereafter to set in situ to provide the desired bond between the afore-mentioned parts, thereby eliminating the need for any mechanical connecting means, and thus saving expensive materials, space, and manufacturing and erecting man-hours.

The said foam further contributes to ensure high degree of electrical insulation of the circuit conductors forming part of the firing system. The heat-isolating and corrosion- and moisture-resistant characteristics of the foam materials are equally advantageous to the final performance of the improved apparatus. In this connection polyurethane foam compositions are especially suitable. The vibration damping characteristics of such foam media are likewise put to advantage in the improved apparatus.

An object of the invention is to provide rocket firing apparatus which can be rapidly re-loaded with a complement of rockets after firing. A particular object is to provide rocket firing apparatus wherein the electrical circuit connections for the supply of energy to the firing system of the rockets will be rapidly and easily effected by insertion of a single junction unit. A further object is to provide such apparatus wherein the rockets will be positively retained against any acceleration forces liable to be applied thereto in flight. Yet a further object is to provide such apparatus which will be readily dismountable into its component parts for speedy replacement of any defective components.

In this connection the invention involves provision of a disc member adapted to be inserted into the casing containing the rockets and comprising a plurality of sleeve elements adapted to fit over the rear ends of respective rockets thereby simultaneously to effect all of the electrical junctions for the latter.

The invention also contemplates the provision of mechanical means for mounting and blocking such a disc in position.

In the ensuing description given by way of example but not of limitation reference is made to the accompanying drawings, wherein:

FIG. 2 is a similar perspective view of the intermediate section of the firing apparatus;

FIG. 3 is a vertical section of the rear part of the apparatus with parts broken away;

FIG. 4 is a corresponding view in plan;

FIG. 5 is a perspective view of a sleeve element used in the supply of electric current to the rocket firing device;

Figure 1:
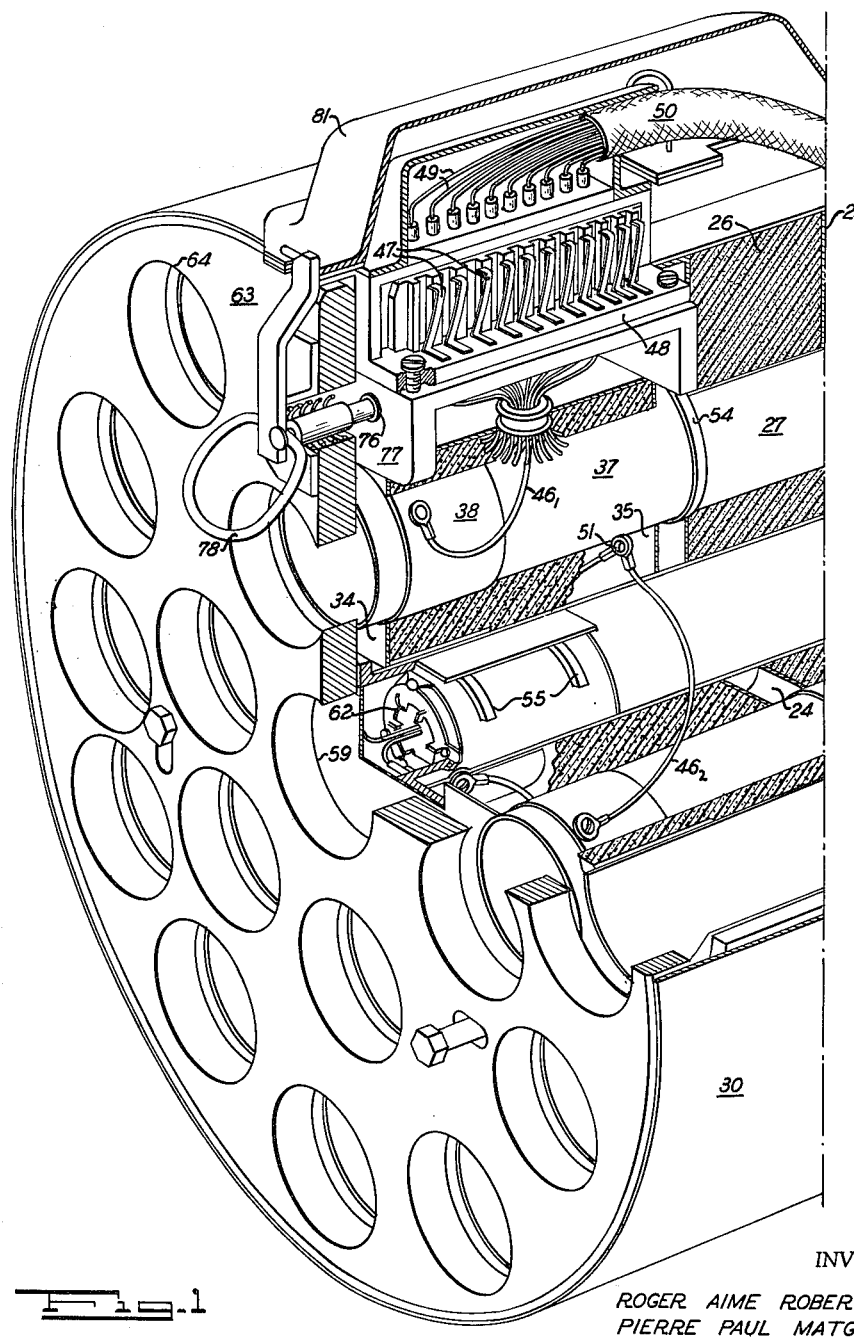
FIG. 1 is a perspective view of the rear part of the apparatus of the invention in one embodiment thereof, various parts being broken away to illustrate internal structure.
Figure 6:
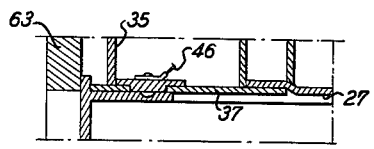
FIG. 6 is a longitudinal sectional view of part of the sleeve with related parts.
Figure 7:
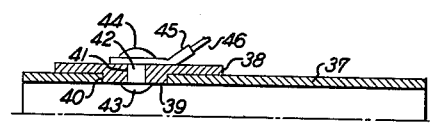
FIG. 7 is a larger-scale view of part of the said sleeve in longitudinal scale.
Figure 8:
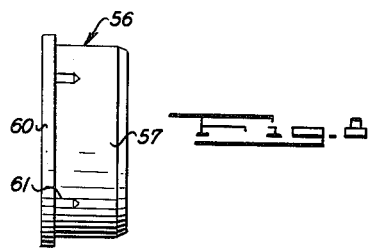
FIG. 8 is a side view of a cap or cover cooperating with the aforesaid sleeve.
Figure 9:
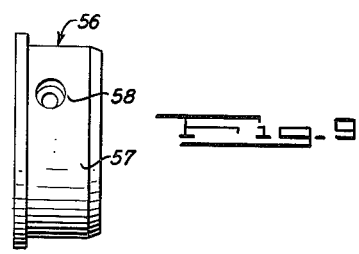
FIG. 9 is a view taken at right angles to that of FIG. 8.

The apparatus shown comprises a number of transverse frame structures spaced along its length, including a rear frame 20, one or more intermediate frames 21 and a foremost frame. According to the invention each frame comprises a double wall 24—25 between the spaced wall elements of which a filling material 26 is interposed which comprises a foam composition hardened in situ from a plastic mass poured between the wall elements, e.g. a polyurethane-base composition. Extending through the frames are tubes 27 serving to retain and guide the rockets and it is contemplated that the filling composition is poured while the walls 24 and 25 are in place and with the tubes 27 inserted through them, so that sections of the tubes form part of the casting mould surfaces. The walls 24 and 25 are formed with circumferential flanges 28 and 29 (FIG. 2) through which the frames are secured to a cylindrical casing 30 by way of rows of rivets 31 and 32. The casing 30 extends beyond the rearmost frame 20, and inserted beyond the frame 20 is an additional frame 33 (FIG. 3) serving to support electrical equipment presently described. The frame 33 comprises the spaced walls 34 and 35 interconnected by a cylindrical wall 36 and is formed with registering holes through which sleeves 37 are supported equal in number and arranged in a similar pattern to the number and pattern of the tubes 27. The sleeves 37 may be made of light alloy. Fixedly secured on each sleeve towards the rear part of it is a ring 38 (FIG. 1) made of insulating material internally formed with diametrically opposed projections 39 (FIG. 7) engaged in correspondingly formed holes 40 of the sleeve, which projections are each formed with a radial hole or duct 41. This hole serves to pass a contact terminal 42 having a head 43 projecting into the interior of the sleeve and an eye 44 for clamping a spade terminal 45 of a conductor 46. Associated with each sleeve is a conductor $46_1$ (FIG. 1) extending from a distribution or supply unit 47 secured to a base 48 having a channel contour in longitudinal section and supplied with electric energy by a set of conductors 49 extending from a cable 50. The other conductor $46_2$ extending from the sleeve 37 is connected with ground potential as shown at 51. The space between the walls 34 and 35, sleeves 37, casing 36 and base 48 which space contains the conductors 46 is filled with foam material set in situ from a cast fluid composition, such as a polyurethane-base mass. When the rockets 52 (FIG. 2) are positioned in their guide tubes 27 the forward ends 53 (FIG. 5) of the sleeves 37 are covered by the enlarged rear ends 54 of the tubes 27, so that the internal surface of the sleeves is continuous with the inner surface of the tubes 27. The rear parts of the rockets 52 are externally provided with conventional tail fins 55 in folded condition, which are received in the sleeves 37 while leaving the rear portions of the sleeves free to receive a cap or cover 56 (FIG. 8) having a cylindrical body 57 fitted with contact elements 58 adapted to cooperate with the projections 43, and the end wall 59 of the cap which forms a projecting flange has axially projecting fingers 61 adapted to engage the wall 34. The contacts 58 are electrically connected with the firing device 62 for the rocket which receives the cap member.

Figure 10:
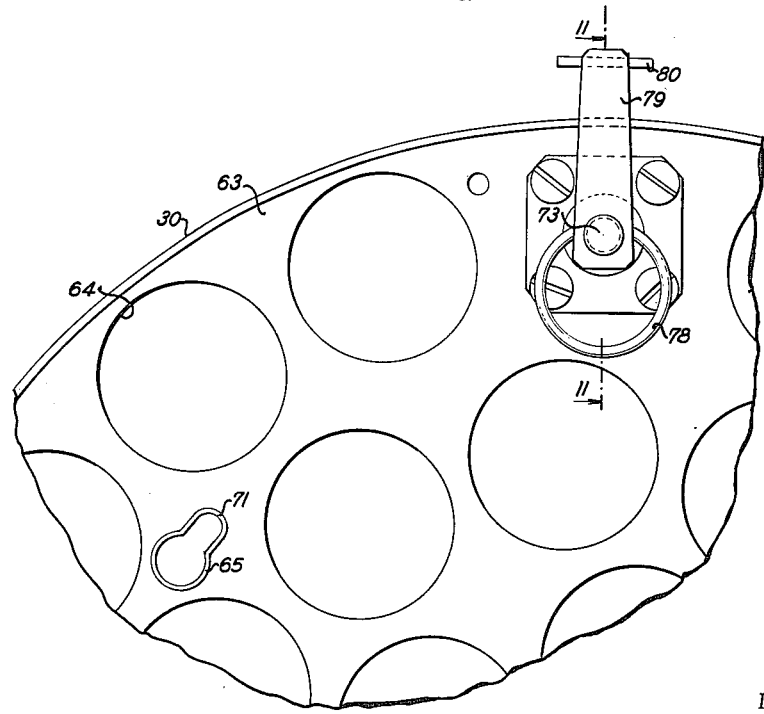
FIG. 10 is a part rear view of a locking frame.
Figure 11:
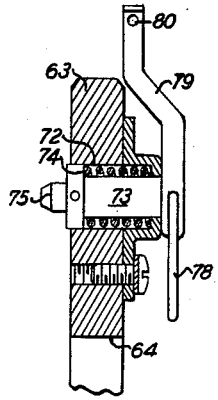
FIG. 11 is a section on line 11—11 of FIG. 10.

With the system loaded with rockets each provided with its cap, the assembly is retained in place by a rear cover comprising a disc 63 having holes 64 (FIG. 10) formed in it equal in number and arranged in a similar pattern to the guide tubes 27, which tubes are thus applied against the end walls 59 of the covers. In assembly, the rear cover is so presented that the enlarged portions 65 of slots formed in the cover are directed towards and register with the heads 66 of rods 67 extending both through the electric support frame 33 and the rear frame 20, and so that the rods rest against the front wall 25 of said rear frame 26 by way of nuts 68, being secured in place by the cooperation of a shoulder 69 with the wall 24. The head 66 may be formed separately and screwed to the rod 67. The cover 63 is then turned by rotation about the general axis of the system, so that the rod 67 or an extension thereof engages the reduced parts 71 (FIG. 10) of the aforementioned eye slots thereby blocking the cover against horizontal displacement. Received in a passage 72 (FIG. 11) formed in cover plate 63 is a plunger pin 73 biased by a spring 74, the plunger having a projection 75 engageable in a hole 76 (FIG. 1) formed in the leg 77 of the base 48 for retaining the cover plate 33 against rotational displacement. For disengaging the plunger pin 75 a pull ring 78 is provided carried by a lever 79 (FIG. 11) pivoted about a pivot 80 on a casing 81 (FIG. 1) rigidly secured to casing 30.

When the rockets have been positioned in the tubes 27 they are retained against longitudinal acceleration forces in both fore and aft directions by the caps 56 (FIG. 8) the rear surfaces of which abuttingly engage the locking cover plate 63 (FIG. 1), and said caps further engaging the frame 20 by way of the fingers 61.

To fire the rockets, firing current is applied in a predetermined sequence to the respective rockets through distributor or timer unit 47 by way of the conductors 46, terminals 42 and the conductors connected to caps 56. The end wall 59 of the cap 56 is destroyed by the discharged gases which are able to escape freely through the holes 64 in the cover 63.

The electric supply frame 33 is readily replaceable. For such replacement plunger 73 is pulled out by action on the ring 78 and the cover plate 63 is rotated to bring the enlargements 65 into register with the heads 66, then a rearward pull is exerted to disengage the cover plate 63 from casing 30. The electric carrier frame 33 is simply pulled out and replaced with a newly equipped frame which is inserted into the rear opening of casing 30 so that the sleeves 37 with which it is fitted are received in the rear holes of the guide tubes 27. The rear cover 63 is then positioned, locked in place by rotation and the pull-ring 78 is released to lock the frame 33 in place.

The apparatus is suspended by way of a pair of suspension means as shown at 82, secured to the intermediate frames 21.

Figure 12:
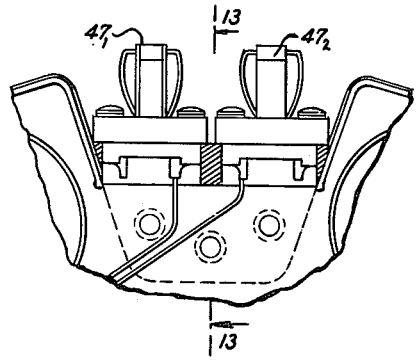
FIG. 12 is a rear view of an electric supply arrangement.
Figure 14:
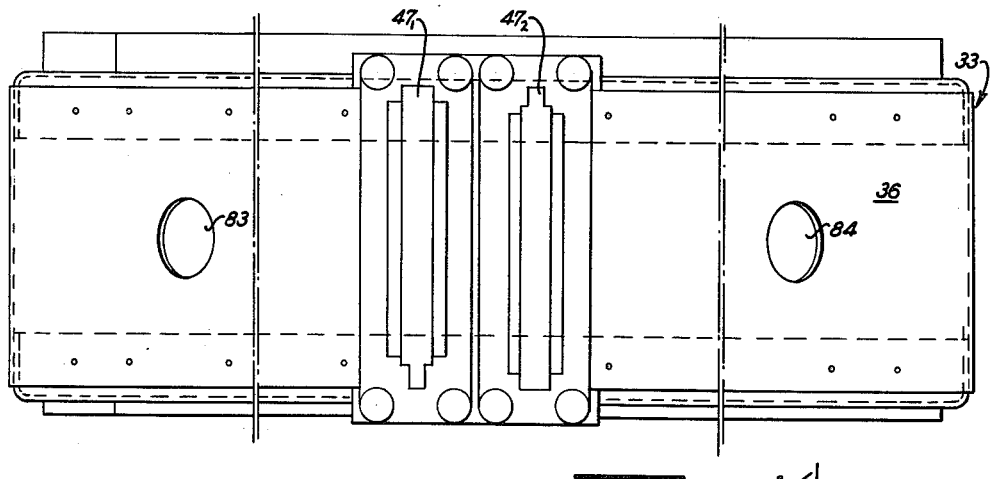
FIG. 14 is a plan view of a carrier frame for supporting the electric components in a modified embodiment.
Figure 13:
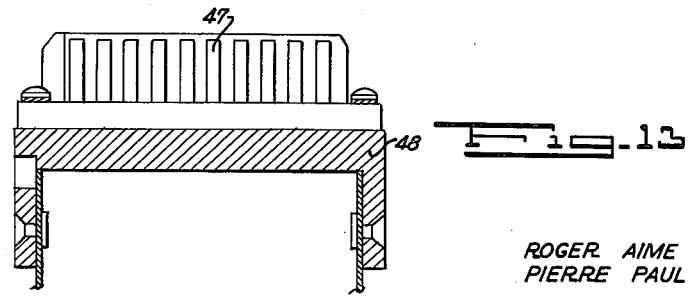
FIG. 13 is a section on line 13—13 of FIG. 12.

In the modified embodiment shown in FIGS. 12 to 14 the electric carrier frame 33 includes a pair of electric distributing arrangements $47_1$ and $47_2$ mounted on a base 48. The holes for pouring the settable foam composition are visible at 83 and 84.

What we claim is:

1. Apparatus comprising an elongated casing having a forward and a rearward end, a plurality of tubes extending through said casing, at least one wall element in said casing supporting said tubes and through which said tubes extend, said wall element including spaced walls provided with openings to accommodate said tubes and a plastic mass between said walls, a frame adjacent said wall element and detachable from said casing, a plurality of sleeves on said frame and extending into said tubes to constitute extensions of the latter, insulating elements on said sleeves, electrical terminals on said insulating elements and extending into said sleeves, covers extending into said sleeves and adapted to contact said electrical terminals and to connect the latter with rockets in said sleeves and tubes, an electrical distributor on said frame, leads connecting said distributor to said terminals, a plastic mass in said frame embedding said sleeves and leads, a disc on the rearward end of said casing holding said frame therein and provided with openings corresponding with said sleeves, and means detachably locking said disc to said casing.

2. Apparatus as claimed in claim 1 wherein said means comprises a rod extending axially through the casing and connected to said wall element, a head on said rod, and a pin resiliently mounted on said disc, said distributor defining an opening to receive said pin to lock said disc against rotation on said casing, said disc being provided with an opening to receive said rod, the opening in said disc including a first section large enough to pass said head and a second section small enough to prevent passage of the head, said rod being positioned in the second section with said pin in the opening in said distributor.

3. Apparatus as claimed in claim 1 comprising means connected to the casing for suspending the same.

4. Apparatus as claimed in claim 1 wherein said walls include peripheral cylindrical flanges connected to said casing.

References Cited in the file of this patent

UNITED STATES PATENTS

| | | |
|---|---|---|
| 2,611,930 | Hill et al. | Sept. 30, 1952 |
| 2,645,999 | Bogard | July 21, 1953 |
| 2,744,042 | Pace | May 1, 1956 |
| 2,792,962 | Granfelt | May 21, 1957 |
| 2,802,398 | Beach | Aug. 13, 1957 |
| 2,844,073 | Re et al. | July 22, 1958 |
| 2,857,626 | Wagner et al. | Oct. 28, 1959 |

OTHER REFERENCES

Electrical Manufacturing, vol. 61, January 1958, pages 67–73, Foamed Plastics for Structural Functions in Electronic Equipment.